United States Patent
Tsuchiya et al.

(10) Patent No.: US 8,592,093 B2
(45) Date of Patent: Nov. 26, 2013

(54) SOLID OXIDE FUEL CELL DEVICE

(75) Inventors: Katsuhisa Tsuchiya, Kitakyushu (JP); Tsukasa Shigezumi, Kitakyushu (JP); Toshiharu Ooe, Kitakyushu (JP); Kiyotaka Nakano, Kitakyushu (JP); Yoshiyuki Kawamura, Kitakyushu (JP)

(73) Assignee: Toto Ltd., Kitakyushu-Shi, Fukuoka (JP)

( * ) Notice: Subject to any disclaimer, the term of this patent is extended or adjusted under 35 U.S.C. 154(b) by 262 days.

(21) Appl. No.: 12/788,857

(22) Filed: May 27, 2010

(65) Prior Publication Data
US 2010/0304243 A1 Dec. 2, 2010

(30) Foreign Application Priority Data
May 28, 2009 (JP) ................................. 2009-129165

(51) Int. Cl.
*H01M 8/06* (2006.01)

(52) U.S. Cl.
USPC .......................................... 429/423; 429/427

(58) Field of Classification Search
None
See application file for complete search history.

(56) References Cited

U.S. PATENT DOCUMENTS

| | | | |
|---|---|---|---|
| 2001/0016275 A1* | 8/2001 | Takamura | 429/20 |
| 2002/0037445 A1 | 3/2002 | Keller et al. | |
| 2004/0058230 A1* | 3/2004 | Hsu | 429/62 |
| 2008/0160362 A1* | 7/2008 | Kadowaki et al. | 429/17 |
| 2008/0176118 A1* | 7/2008 | Edlund et al. | 429/17 |
| 2011/0053017 A1* | 3/2011 | Takahashi | 429/423 |

FOREIGN PATENT DOCUMENTS

| | | |
|---|---|---|
| JP | 2003-223912 A | 8/2003 |
| JP | 2004-060910 A | 2/2004 |
| JP | 2008-135268 A | 6/2008 |
| JP | 2008-243592 A | 10/2008 |
| JP | 2010-014302 | 1/2010 |
| WO | WO 02/059987 A2 | 8/2002 |
| WO | WO 02/059987 A3 | 8/2002 |
| WO | WO 2009/028427 * | 3/2009 |

OTHER PUBLICATIONS

Machine translation of JP 2008-243592, retrieved from <http://www19.ipdl.inpit.go.jp/PA1/cgi-bin/PA1DETAIL> on Jan. 10, 2013.*
Machine translation fo JP 2008-243592, retrieved from <http://www19.ipdl.inpit.go.jp/PA1/cgi-bin/PA1DETAIL> on Aug. 2, 2013.*
Extended European Search Report for European Application No. 10164035.7, dated Sep. 9, 2010, 6 pages.

* cited by examiner

*Primary Examiner* — Cynthia K. Walls
(74) *Attorney, Agent, or Firm* — Brinks Gilson & Lione

(57) ABSTRACT

A solid oxide fuel cell (SOFC) device comprises a fuel cell assembly, a reformer, a fuel gas supply device, a reforming air supply device, a power generating air supply device, an ignition device, a temperature detection devices for detecting the temperature caused by combustion of fuel gas, and a control section for sequentially conducting a combustion operation in which fuel gas is ignited by the ignition device and combusted using the power generating air, a POX operation, an ATR operation, and an SR combination, wherein the control section determines that a flameout has occurred when the amount by which the temperature caused by combustion of fuel gas and detected by the temperature detection device drops within a predetermined time is equal to or greater than a preset, predetermined temperature drop threshold, and the predetermined temperature drop threshold is set as a plurality of predetermined temperature drop thresholds in accordance with temperature bands caused by the combustion of fuel gas, the lower the temperature induced by the combustion of fuel gas, the higher is the temperature drop threshold.

20 Claims, 12 Drawing Sheets

FIG.9

| MODE | STATE | FUEL FLOW RATE (L/min) | REFORMING AIR FLOW RATE (L/min) | POWER GENERATING AIR FLOW RATE (L/min) | WATER FLOW RATE (cc/min) | TEMPERATURE CONDITIONS FOR TRANSITION(°C) | |
|---|---|---|---|---|---|---|---|
| | | | | | | REFORMER | STACK |
| STARTUP MODE | COMBUSTION OPERATION | | | | | 300°C OR ABOVE | — |
| | POX1 | 6.0 | 10.0 | 100.0 | 0.0 | 350°C OR ABOVE | — |
| | POX2 | 6.0 | 10.0 | 100.0 | 0.0 | 600°C OR ABOVE | 250°C OR ABOVE |
| | ATR1 | 6.0 | 18.0 | 100.0 | 0.0 | 600°C OR ABOVE | 400°C OR ABOVE |
| | ATR2 | 6.0 | 8.0 | 100.0 | 2.0 | 650°C OR ABOVE | 600°C OR ABOVE |
| | SR1 | 4.0 | 4.0 | 100.0 | 3.0 | 650°C OR ABOVE | 700°C OR ABOVE |
| | SR2 | 3.0 | 0.0 | 100.0 | 8.0 | 650°C OR ABOVE | 700°C OR ABOVE |
| | | 2.3 | 0.0 | 80.0 | 5.8 | | |

SOLID OXIDE FUEL CELL DEVICE

RELATED APPLICATIONS

This application claims priority under 35 U.S.C. §119 to Japanese Patent Application No. 2009-129165 filed on May 28, 2009, the entire content of which is hereby incorporated by reference.

BACKGROUND OF THE INVENTION

1. Technical Field

The present invention relates to a solid oxide fuel cell ("SOFC" below) device, and more particularly to a solid oxide fuel cell device for generating power by reacting fuel gas with air.

2. Description of the Related Art

Solid oxide fuel cell (SOFC) device operates at relatively high temperatures, using an oxide ion-conducting solid electrolyte as an electrolyte, with electrodes placed on each side thereof, and with fuel gas supplied to one side thereof and oxidant (air, oxygen, or the like) supplied to the other side thereof.

In such SOFC device, steam or $CO_2$ is produced by the reaction between oxygen ions passed through the oxide ion-conducting solid electrolyte and fuel, thereby generating power and thermal energy. The electrical power is removed from the SOFC device, where it is used for various electrical purposes. The thermal energy is transferred to the fuel, the SOFC device, the oxidant, and the like, and is used to raise the temperature thereof.

In conventional SOFC, the power generating chamber is disposed beneath a sealed space within the fuel cell module, and a fuel cell assembly furnished with multiple fuel cells is disposed within this generating chamber. A combustion chamber is formed above this fuel cell assembly; residual fuel gas and oxidant gas (air) combust directly in the upper portion itself of the fuel cell assembly, and exhaust gas is produced within the combustion chamber.

A reformer for reforming fuel gas into hydrogen is disposed at the top of the combustion chamber, and the reformer is heated by the heat of combustion within the combustion chamber to a temperature sufficient to perform reforming.

However, in conventional SOFC device of this type, other than directly combusting the residual fuel gas and oxidant gas at the top portion itself of the fuel cell assembly, no heating means such as a burner was provided to separately heat the combustion chamber or the reformer, or to ignite fuel gas at the upper portion of the fuel cell assembly during cold starts in order to start the fuel cell module at essentially the outside temperature or a temperature below the outside temperature, or to support the prevention of flameout or blow out after ignition, and so forth. It was therefore extremely difficult to perform reliable uniform ignition over the entirety of the multiple fuel cells which may exceed 100 in number, due to formation defects in the ignition portion caused by variability in the structure of the cell itself, and in particular, the effects of unstable airflows within the combustion chamber when cold starting the fuel cell module at a temperature which is essentially equal to or below the outside temperature; even if ignition occurs, flameout can occur due to the slightest turbulence in air flow and the like, making it extremely difficult to achieve a stable ignition or maintain an ignited state.

To counter ignition deficiencies of this type, it has been proposed in Japanese Patent Unexamined Publication No. 2008-135268 (JP-2008-135268A) and the like that such ignition problems caused by air flow could be countered by reducing the supply flow rate of the air which threatens to blow out the flame when the fuel cell ignites.

SUMMARY OF THE INVENTION

However, in the SOFC device of the aforementioned JP-2008-135268A, it is difficult to achieve reliable flame diffusion across the entirety of the cells after igniting a portion of the multiple cells using only the reduction in the flow rate of air supplied to the fuel cell at the time of ignition as a countermeasure for suppressing ignition problems, and the problem remains that flameout can occur easily.

While there is combustion of the blended gas made up of fuel gas and air at the time of ignition and immediately following, a reforming reaction is started within the reformer as the temperature rises due to this combustion, causing the fuel gas component to change and the water component to begin to increase. However, there is not in particular a uniform occurrence of the reforming reaction inside the reformer, and the fuel gas component also fluctuates in an unstable manner, therefore flameout can occur easily during the period when the reformer is in a low temperature region.

In the conventional SOFC device of this type, the lower the temperature induced by combustion of the fuel gas, the lower will be the amount of stored heat in the fuel cell assembly, the fuel cell module, etc., therefore while the temperature drops very quickly when a flameout occurs, there is a large amount of stored heat in the fuel cell assembly, the fuel cell module, and so forth, so it is difficult for a noticeable drop in temperature to occur within the fuel cell module even if a flameout does occur, making it very difficult to determine a flameout state.

It is therefore an object of the present invention to provide a solid oxide fuel cell (SOFC) device capable of accurately and quickly determining flameout in accordance with the temperature state (amount of stored heat) of the fuel cell assembly or fuel cell module in the fuel cell structure where flameout is prone to occur.

The above object is achieved according to the present invention by providing a solid oxide fuel cell device for generating power by reacting fuel gas and air, comprising: a fuel cell assembly disposed in a power generating chamber inside a fuel cell module and furnished with a plurality of solid oxide fuel cells; a reformer for steam reforming fuel gas and supplying the fuel gas to the fuel cell assembly; a fuel gas supply device for supplying the fuel gas to the reformer; a water supply device for producing pure water and supplying the pure water to the reformer; a reforming air supply device for supplying reforming air to the reformer; a power generating air supply device for supplying power generating air to the fuel cell assembly; an ignition device for igniting and combusting the fuel gas reaching the upper portion of the fuel cell assembly from the reformer; a temperature detection device for detecting the temperature caused by combustion of the fuel gas; and a control device for controlling the fuel gas supply device, the water supply device, the reforming air supply device, the power generating air supply device, the ignition device, and the temperature detection device to conduct a combustion operation in which the fuel gas is ignited by the ignition device and combusted with the reforming air upon a startup of the solid oxide fuel cell device, then to supply the fuel gas and the reforming air into the reformer to conduct a partial oxidation reforming reaction (POX) operation, then to supply the fuel gas, the reforming air, and the water into the reformer to conduct an auto-thermal reforming reaction (ATR) operation, and then to supply the fuel gas and water into the reformer to conduct a steam reforming reaction (SR) operation, thereby starting the solid oxide fuel cell device; wherein the control device determines that a flameout has occurred when the amount by which the temperature caused by combustion of the fuel gas and detected by the temperature detection device drops within a predetermined time is greater than a preset predetermined temperature drop threshold; wherein the preset predetermined temperature drop threshold is set as a plurality of predetermined temperature drop thresholds in accordance with temperature bands caused by the combustion of fuel gas, and the lower the temperature caused by the combustion of fuel gas, the higher is the predetermined temperature drop threshold.

In the present invention thus constituted, taking note of the fact that the lower the temperature induced by the combustion of fuel gas (the temperature detected by, for example, an exhaust temperature sensor, an ignition temperature sensor, or the like), the lower will be the amount of stored heat in the fuel assembly, the fuel cell module, or the like, therefore a temperature drop quickly occurs when a flameout or blow out occurs, whereas when the temperature induced by combustion of the fuel gas is relatively high, it is difficult for a temperature drop to occur due to the large stored heat in the fuel cell assembly or the fuel cell module, therefore a plurality of thresholds for the amount of temperature drop used to determine flameout are set in accordance with the temperature bands caused by the combustion of fuel gas, and such settings are set so that the lower the temperature caused by the combustion of fuel gas, the higher will be the value of the setting. The present invention thus enables accurate and quick determination of flameout in accordance with the temperature state of the fuel cell assembly or the fuel cell module, i.e., the amount of stored heat, thereby enabling quick recovery from flameout.

In a preferred embodiment of the present invention, the control device determines that a flameout has occurred when a temperature caused by the combustion of the fuel gas is equal to or less than a predetermined temperature.

In the present invention thus constituted, erroneous determinations of flameout can occur due to temperature drops caused by fluctuations in the combustion of fuel gas; for this reason the time for determining flameout must be extended, but flameout can be determined by adopting, as a flameout determination temperature threshold, a temperature caused by the combustion of the fuel gas which could not be due to anything other than flameout.

In another preferred embodiment of the present invention, the control device determines that a flameout has occurred when the state in which the temperature caused by the combustion of the fuel gas drops by equal to or more than a preset, predetermined temperature drop threshold continues for a predetermined time.

In the present invention thus constituted, the flameout is determined to have occurred when a state continues for a predetermined time in which the temperature caused by the combustion of fuel gas drops by equal to or more than a preset, predetermined temperature drop threshold, therefore a quick flameout determination can be performed, and erroneous judgments can be prevented.

In still another preferred embodiment of the present invention, the temperature detection device detects the temperature of exhaust gas produced by the combustion of the fuel gas as the temperature caused by the combustion of the fuel gas.

In the present invention thus constituted, since the temperature detection device detects the temperature of exhaust gas produced by the combustion of fuel gas as the temperature caused by the combustion of fuel gas, a quick and accurate determination of flameout can be made without being affected by the thermal capacity or the amount of stored heat of the fuel cell assembly.

In another preferred embodiment of the present invention, the temperature detection device directly detects the temperature in the combustion state ignited at the top end of the fuel cell assembly as the temperature caused by the combustion of the fuel gas.

In the present invention thus constituted, the temperature detection device directly detects the temperature in the state whereby combustion is ignited at the top end of the fuel cell assembly as the temperature caused by combustion of fuel gas, thus enabling flameout to be determined.

In another preferred embodiment of the present invention, the control device determines that a flameout has occurred when the state in which the temperature detected by the temperature detection device is equal to or less than a predetermined temperature continues for equal to or more than a predetermined time, and the predetermined time during which the state of being equal to or less than the predetermined temperature continues for the determination of flameout is set to be shorter than the predetermined time during which the state of dropping by equal to or more than the predetermined temperature drop threshold continues for the determination of flameout.

In the present invention thus constituted, when the flameout is determined by the continuation for equal to or more than a predetermined time of the state in which the temperature detected by the temperature detection device is equal to or less than a predetermined temperature, the flameout determination can be accomplished even if the continuation time is relatively short, therefore the flameout determination can be quickly accomplished. On the other hand, when determining the flameout by the continuation for a predetermined time of a state in which the temperature caused by combustion of fuel gas below than a preset, predetermined temperature drop threshold, accurate flameout determination can be accomplished using a relatively long continuation time. In other words, erroneous determinations can be prevented and quick and accurate flameout determinations made by taking advantage of the respective advantageous continuation time regions of the fuel gas combustion-induced temperature thresholds and temperature drop thresholds, with each compensating for the other's disadvantageous regions.

In another preferred embodiment of the present invention, when determining the flameout using the temperature of the exhaust gas as the temperature caused by the combustion of fuel gas, the control device amends the temperature drop threshold to be greater when the power generating chamber temperature inside the fuel cell module is equal to or greater than the preset, predetermined temperature than when the power generating chamber temperature is less than the preset, predetermined temperature.

In the present invention thus constituted, because the temperature drop threshold is compensated so that the temperature drop threshold increases more when the power generating chamber temperature caused by the combustion of fuel gas exceeds a preset, predetermined temperature than when the generating chamber temperature is less than a predetermined temperature, a more accurate flameout determination can be accomplished.

In another preferred embodiment of the present invention, when determining the flameout using the temperature of the exhaust gas as the temperature caused by the combustion of fuel gas, the control device determines that a flameout has occurred when the state in which the temperature of the exhaust gas drops by equal to or more than the preset, predetermined temperature drop threshold continues for a predetermined time, and amends the predetermined time to for the determination of flameout to be longer when the power generating chamber temperature is equal to or greater than the preset, predetermined temperature than when the power generating chamber temperature is less than the preset, predetermined temperature.

In the present invention thus constituted, when determining flameout using the exhaust gas temperature as the temperature caused by the combustion of fuel gas, a determination of flameout is made when a state in which the temperature caused by the combustion of fuel gas drops by equal to or more than a preset, predetermined temperature drop threshold continues for a predetermined time; this predetermined time for determining flameout is compensated to be longer when the generating chamber temperature is equal to or greater than a preset, predetermined temperature than when the generating chamber temperature is less than a preset, predetermined temperature, therefore an accurate flameout determination can be made.

In another preferred embodiment of the present invention, when determining that a flameout has occurred, the control device supplies the fuel gas at an increased flow rate, if the temperature detection device does not detect a rise in temperature caused by combustion of the fuel gas, the control device finally determines that a flameout has occurred, and when the flameout is finally determined, re-ignition of the ignition device is implemented.

In the present invention thus constituted, a final determination of flameout can be made by increasing the flow rate of fuel gas supplied and confirming that there is no rise in temperature caused by combustion of the fuel gas, even in cases where flameout determination is extremely difficult due to an extremely large number of fuel cells.

In another preferred embodiment of the present invention, the control device further comprises a reformer temperature detector for detecting the temperature of the reformer, the control device determines that a flameout has occurred by using the exhaust gas temperature detected by the exhaust temperature detector as the temperature caused by the combustion of fuel gas, and the control device determines that the ignition has been done by the reformer temperature detected by the reformer temperature detector.

In the present invention thus constituted, ignition can be determined along with flameout.

The above object is also achieved according to the present invention by providing a solid oxide fuel cell device for generating power by reacting fuel gas and air, comprising: a fuel cell assembly disposed in a generating chamber within a fuel cell module and furnished with a plurality of solid oxide fuel cells; means for steam reforming fuel gas and supplying the fuel gas to the fuel cell assembly; means for producing pure water and supplying same to the steam reforming means; means for supplying reforming air to the reforming means; means for supplying power generating air to the fuel cell assembly; means for igniting and combusting the fuel gas coming from the steam reforming means and reaching the top portion of the fuel cell assembly; means for detecting temperature caused by the combustion of fuel gas; and means for controlling the fuel gas supply means, the water supply means, the reforming air supply means, the power generating air supply means, the ignition means, and the temperature detection means to conduct a combustion operation in which the fuel gas is ignited by the ignition means and combusted with the reforming air upon a startup of the solid oxide fuel cell device, then to supply fuel gas and reforming the reforming air into the reformer to conduct a partial oxidation reforming reaction (POX) operation, then to supply the fuel gas, the reforming air and the water into the steam reforming means to conduct an auto-thermal reforming reaction (ATR) operation, and then to supply fuel gas and the water into the steam reforming means to conduct a steam reforming reaction (SR) operation, thereby starting the solid oxide fuel cell device; wherein the control means determines that a flameout has occurred when the amount by which the temperature caused by combustion of the fuel gas and detected by the temperature detecting means drops within a predetermined time is equal to or greater than a preset, predetermined temperature drop threshold; wherein the predetermined temperature drop threshold is set as a plurality of predetermined temperature drop thresholds in accordance with temperature bands caused by the combustion of fuel gas, and the lower the temperature caused by the combustion of fuel gas, the higher is the predetermined temperature drop threshold.

With the solid oxide fuel cell (SOFC) device of the present invention, flameout determination can be accurately and quickly performed in accordance with the temperature state of a fuel cell assembly or fuel cell module in a fuel cell structure with a propensity toward flameout.

The above and other objects and features of the present invention will be apparent from the following description by taking reference with accompanying drawings employed for preferred embodiments of the present invention.

BRIEF DESCRIPTION OF THE DRAWINGS

In the accompanying drawings:

FIG. 9 is an operation table showing an example of a startup processing procedure for a solid oxide fuel cell (SOFC) device according to an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
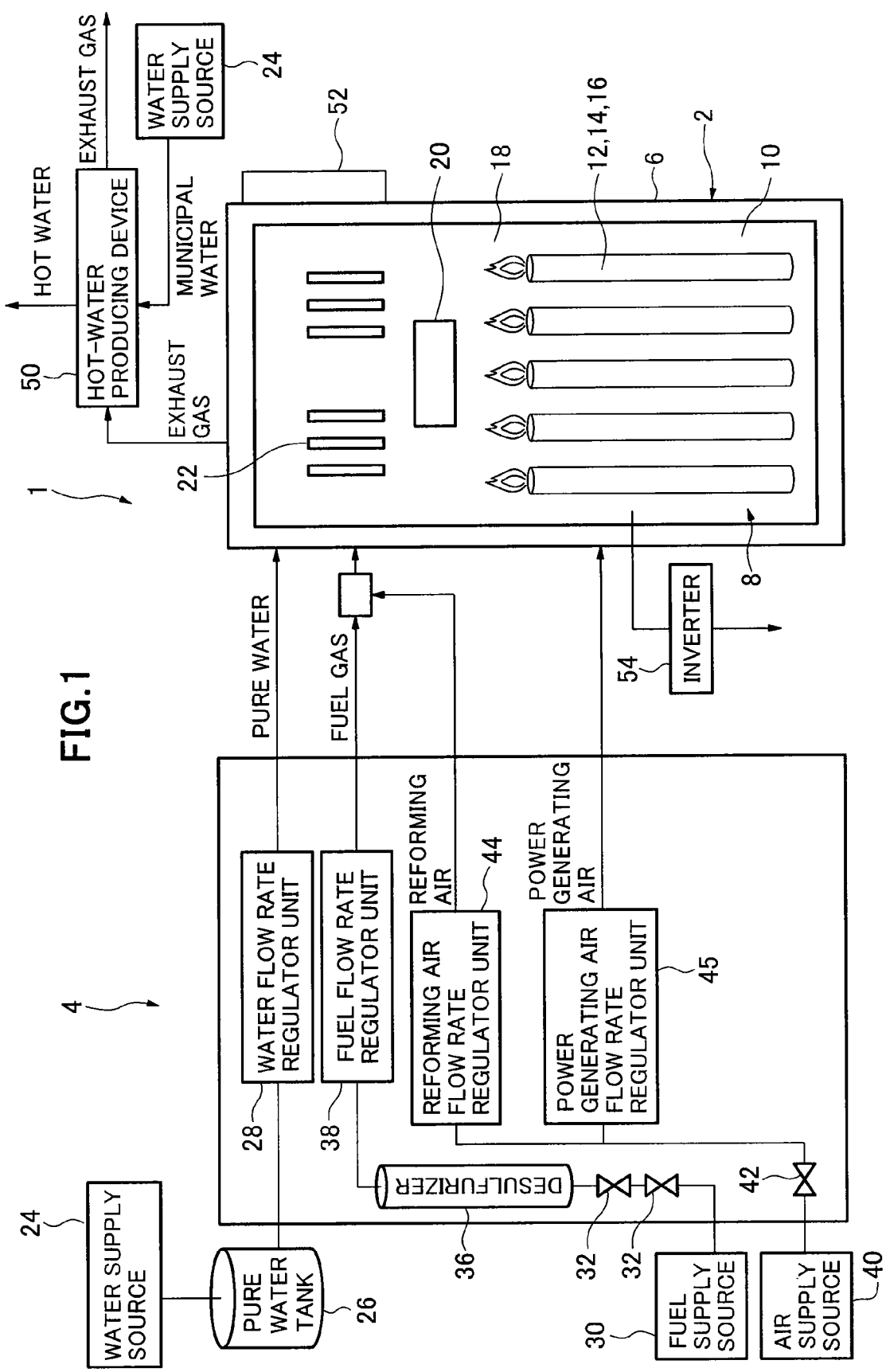
FIG. 1 is an overview schematic view showing a solid oxide fuel cell (SOFC) device according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
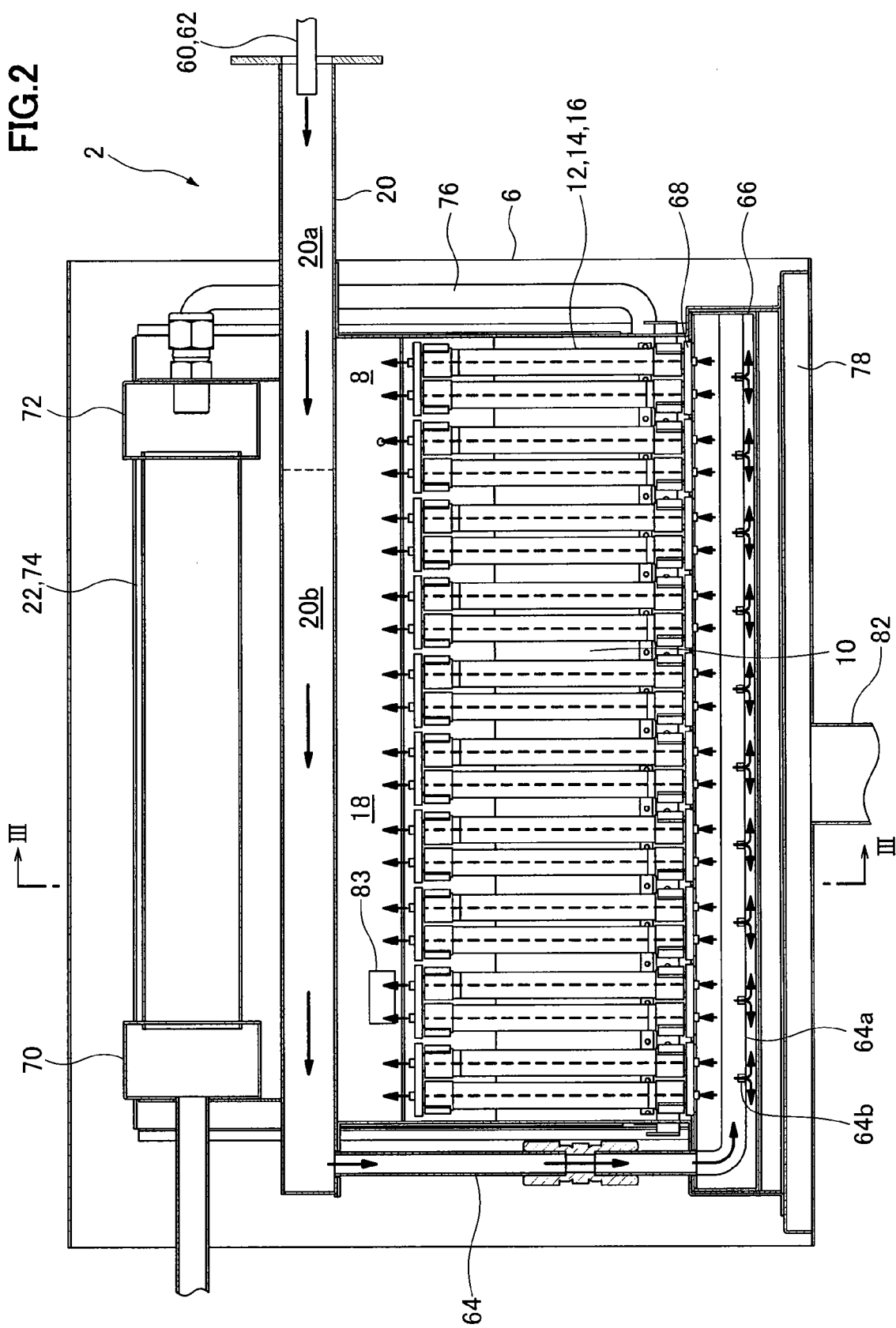
FIG. 2 is a front sectional view showing a solid oxide fuel cell (SOFC) device according to an embodiment of the present invention.
Figure 3:
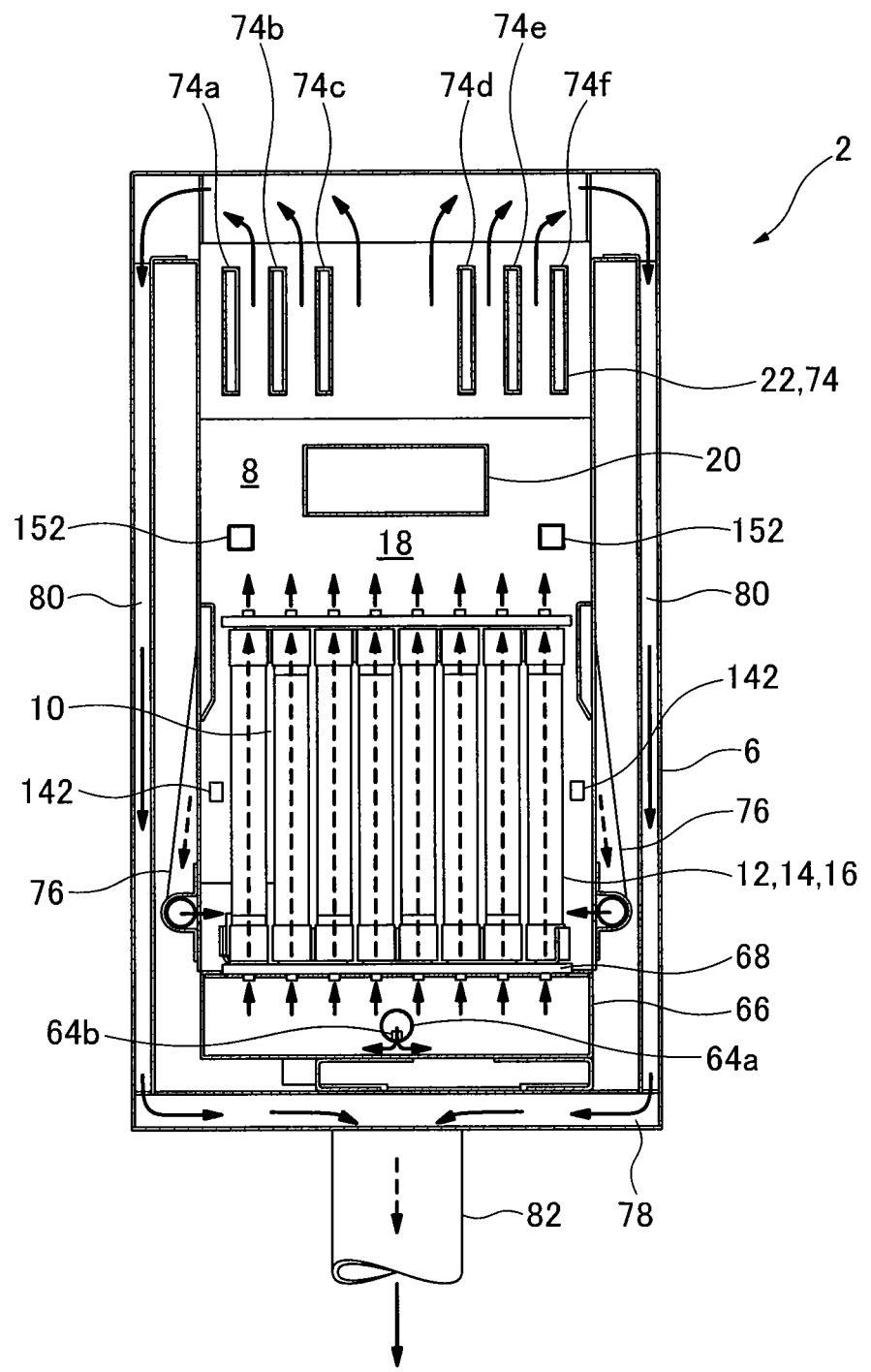
FIG. 3 is a sectional view seen along a line III-III of FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
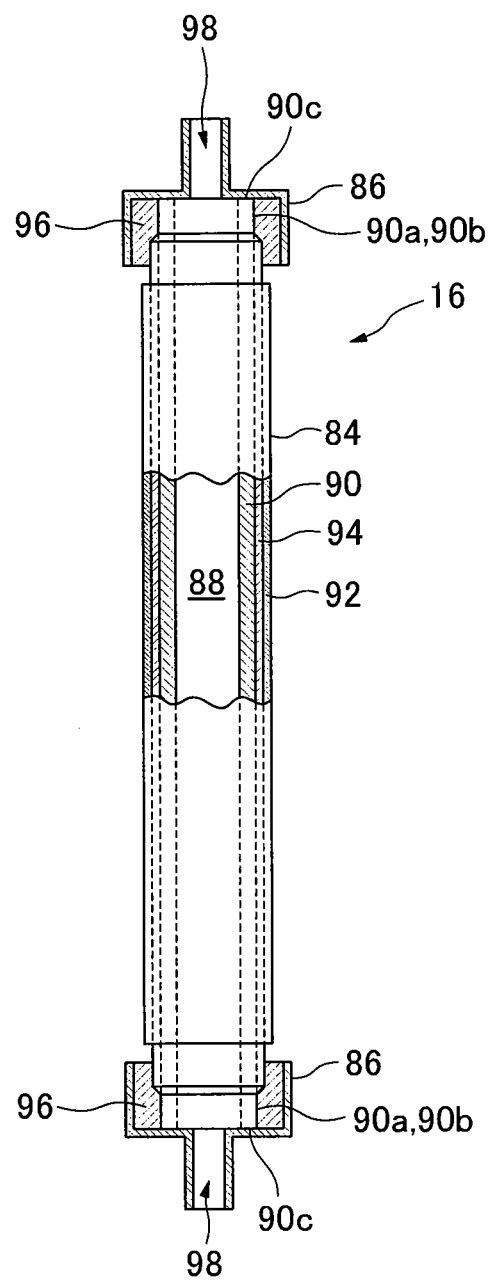
FIG. 4 is a partial sectional view showing a fuel cell unit of a solid oxide fuel cell (SOFC) device according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
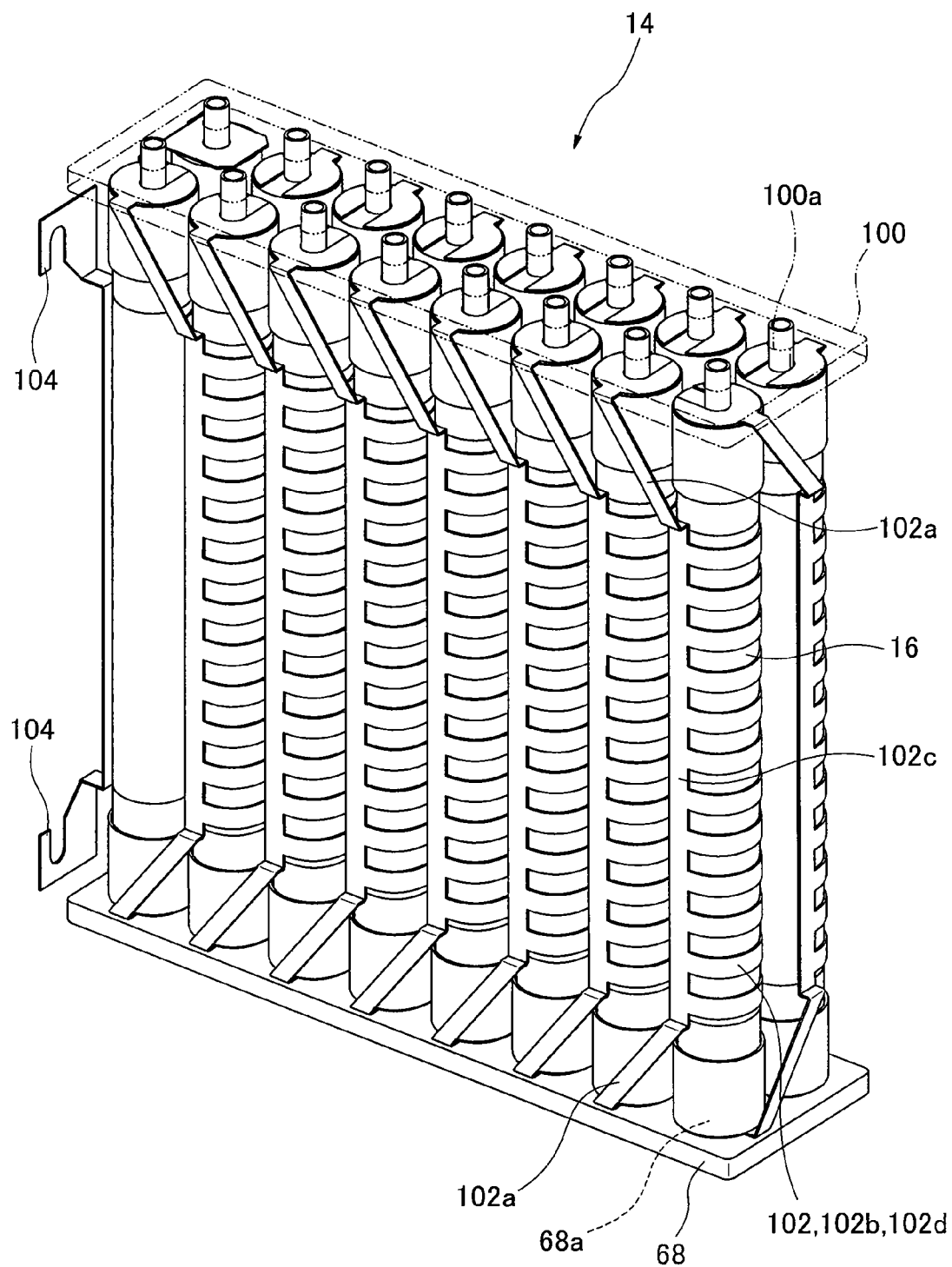
FIG. 5 is a perspective view showing a fuel cell stack of a solid oxide fuel cell (SOFC) device according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
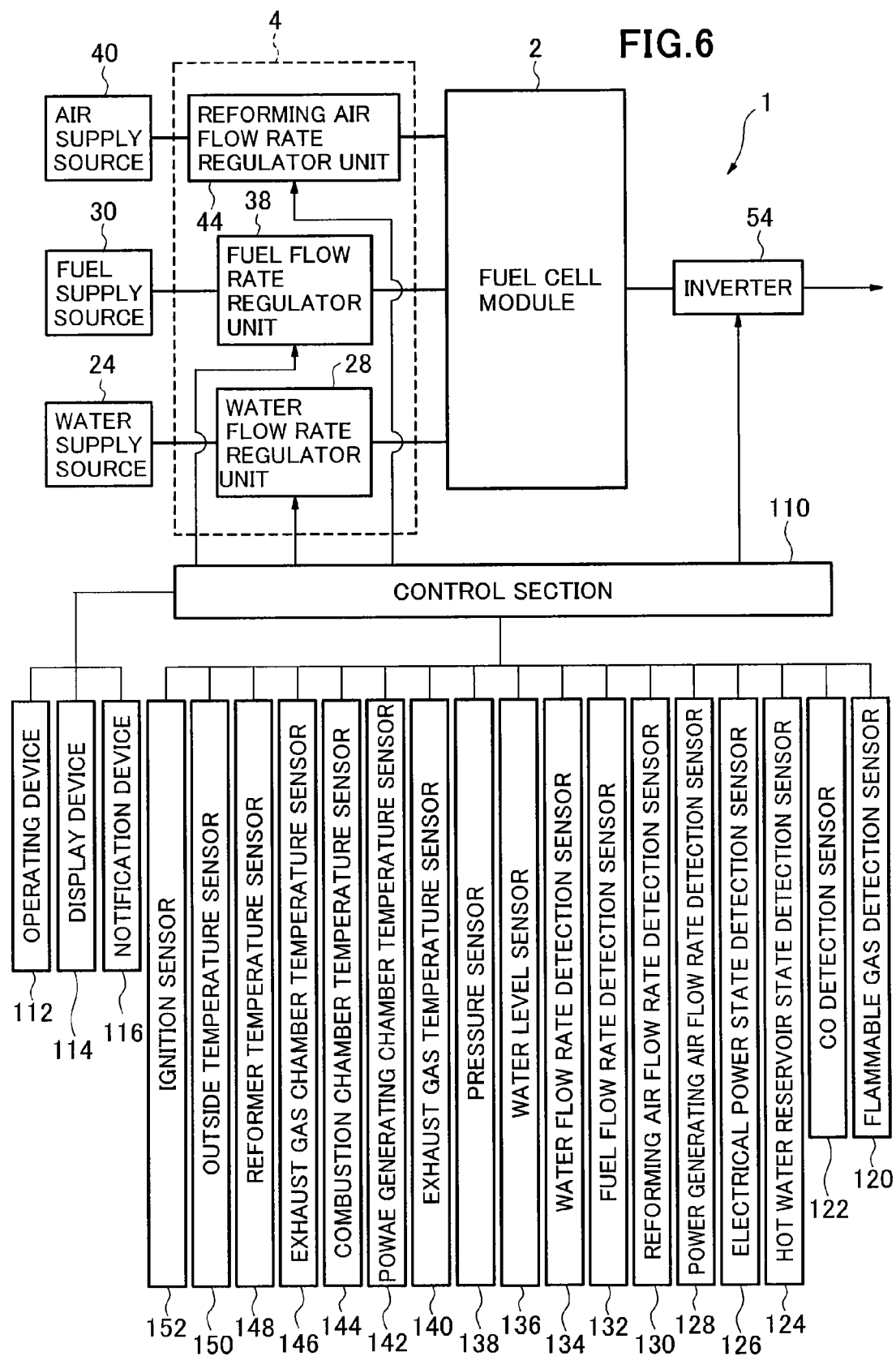
FIG. 6 is a block diagram showing a solid oxide fuel cell (SOFC) device according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

As shown in FIG. 3, ignition sensors 152 are provided in several locations near the top end portion of the fuel cell assembly 12, and function to detect the temperature around the top end portion of the fuel cell assembly 12 when the ignition device 83 is ignited, and to determine the ignition state based on the temperature.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

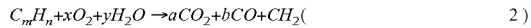

$$C_mH_n + xO_2 + yH_2O \rightarrow aCO_2 + bCO + CH_2( \qquad (2)$$

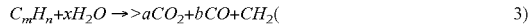

$$C_mH_n + xH_2O \rightarrow > aCO_2 + bCO + CH_2( \qquad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained.

Figure 8:
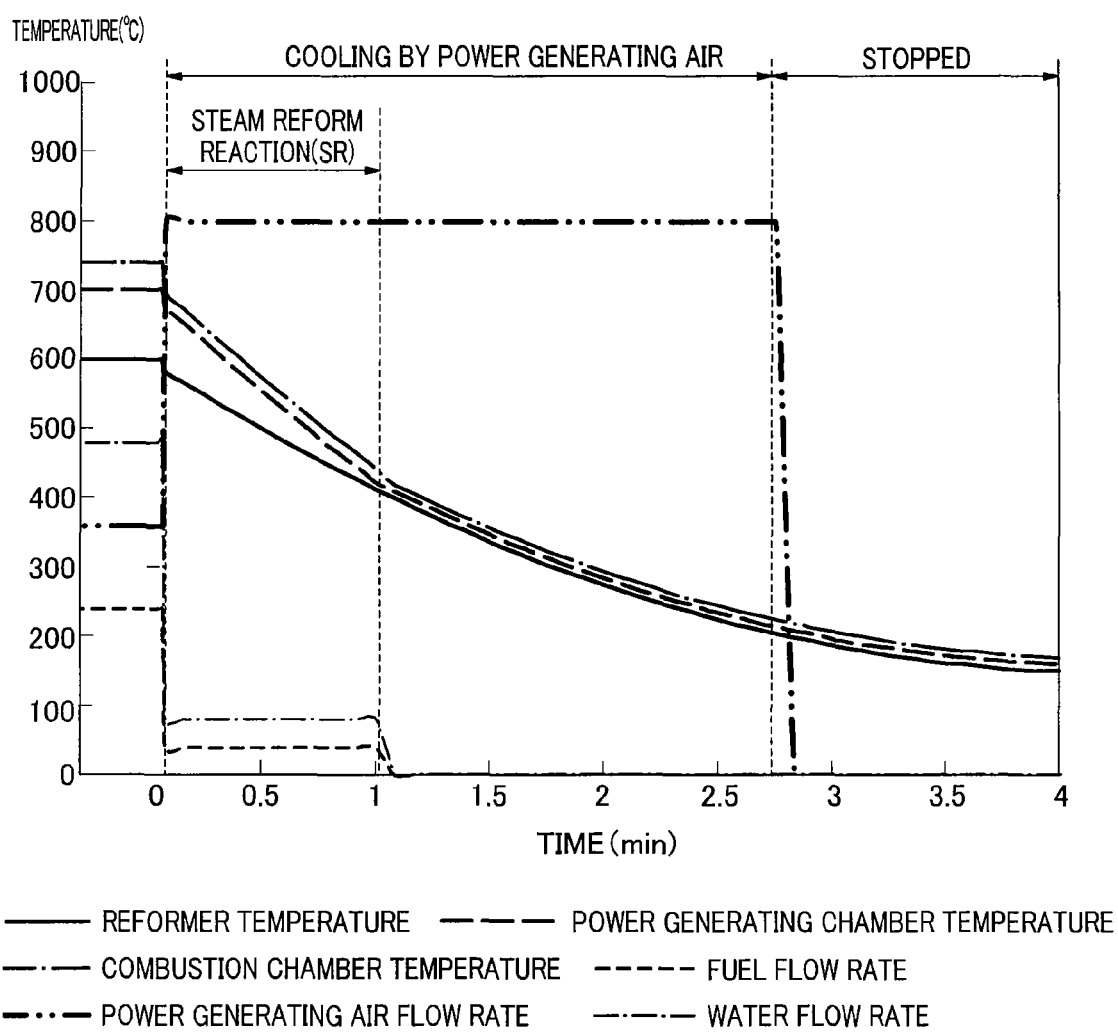
FIG. 8 is a timing chart showing an operation upon stopping a solid oxide fuel cell (SOFC) device according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIG. 9 and again to FIG. 7, the startup processing which occurs in a solid oxide fuel cell device according to an embodiment of the present invention will be described in detail. FIG. 9 is an operation table showing the startup processing procedure for the solid oxide fuel cell device 1.

Figure 7:
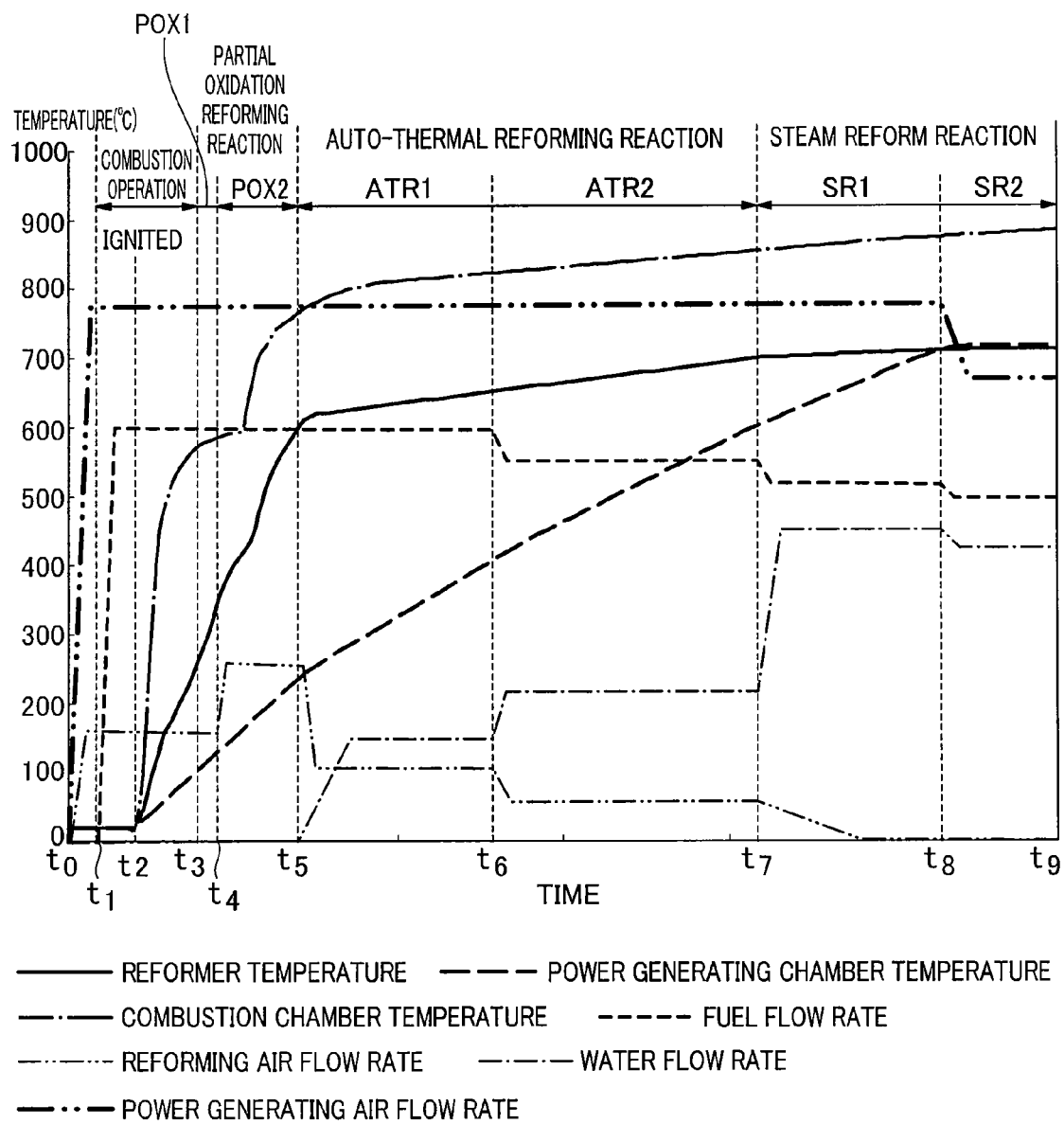
FIG. 7 is a timing chart showing an operation upon startup of a solid oxide fuel cell (SOFC) device according to an embodiment of the present invention.

When the solid oxide fuel cell device 1 is started at time t0 in FIG. 7, the control unit 110 sends a signal to the reforming air flow rate regulator unit 44 which serves as the reforming air supply device, and to the generating air flow rate regulator unit 45 which serves as the power generating air supply device, thereby starting those devices and supplying reforming air and power generating air to the fuel cell module 2. Note that in the embodiment of the present invention, the flow rate of reforming air supplied when supply begins at time t0 is set at 10 L/min, and the flow rate of power generating air supplied is set at 100 L/min.

Next, at time t1, the control unit 110 sends a signal to the fuel flow rate regulator unit 38 serving as a fuel gas supply device, thereby starting the supply of fuel to the reformer 20. The fuel gas and reforming air fed into the reformer 20 are fed into each of the fuel cell units 16 via the reformer 20, the fuel gas supply line 64, and the manifold 66. The fuel gas and reforming air fed into each of the fuel cell units 16 flows out from the respective top ends of the fuel gas flow paths 98 on each of the fuel cell units 16. In the embodiment of the present invention, the flow rate of fuel gas supplied when supply begins at time t1 is set at 6 L/min (refer to the "combustion operation" state shown in FIG. 9).

In addition, at time t2, the control unit 110 sends a signal to the ignition device 83, igniting the unreformed fuel gas which has flowed out of the top end of the fuel gas flow path 98 on the fuel cell units 16. This results in combustion of the fuel gas in the combustion chamber 18; the reformer 20 disposed thereabove is heated, and the temperature of the combustion chamber 18, generating chamber 10, and fuel cell stack 14 disposed inside thereof also rise (refer to times t2-t3 in FIG. 7 and to the "combustion operation" state in FIG. 9).

A partial oxidation reforming reaction (POX) occurs when the temperature of the reformer 20 rises to approximately 300° C. as a result of heat in the reformer 20 (time t3 in FIG. 7). Since the partial oxidation reforming reaction is an exothermic reaction, the reformer 20 is heated by the heat of the partial oxidation reforming reaction (see the "POX1" state in FIG. 9).

At time t2, irrespective of whether all the fuel cell units 16 are completely ignited, the time at which ignition is performed by the ignition device 83 is tentatively viewed as the "ignition timing" time.

Therefore, regarding the determination of whether all the fuel cell units 16 are fully ignited, the control unit 10 determines whether flameout of all the fuel cell units 16 has occurred by using predetermined flameout and ignition determination control (described in detail below).

Furthermore, when the temperature rises and the temperature of the reformer 20 reaches 350° C. in the POX1 operating region, the control unit 110 sends a signal to the fuel flow regulator unit 38 and to the generating air flow rate regulating unit 45, and sends a signal to the reforming air flow rate regulator unit 44 in a state whereby the fuel supply flow rate and the power generating air supply flow rate are maintained at a fixed level, thereby increasing the supply flow rate of reforming air (see time t4 in FIG. 7).

The fuel supply flow rate is thus maintained at 6 L/min and the power generating air supply flow rate is maintained at 100

L/min, while the reforming air supply flow rate is changed to 18 L/min (see the "POX2" state in FIG. 9). These supply flow rates are appropriate for stably producing a partial oxidation reforming reaction (POX2).

In particular, the fuel supply flow rate is held at a constant level (6 L/min) without variation starting from the combustion operating region, through the POX1, POX2, and ATR1 operating regions (described in detail below), and the regions up to the time t6 at which ATR2 (described in detail below) starts (the combustion operating region, the POX1 operating region, the POX2 operating region, and the ATR1 operating region).

Furthermore, the generating air supply flow rate is held at a constant level (100 l/min) from the combustion operating region through the POX1, POX2, ATR1 (described in detail below), the ATR 2 (described in detail below) and the SR1 (described in detail below) operating regions, and the regions up to the time t8 at which SR2 starts (the combustion operating region, the POX1 operating region, the POX2 operating region, the ATR1 operating region, the ATR2 operating region, and the SR1 operating region).

In other words, in the combustion operating region and the POX1 operating region corresponding to the initial temperature region at which a tentative partial oxidation reforming reaction (POX1) starts to proceed, by holding the flow rate of fuel gas supply at a level greater than that of ATR2, and holding the flow rate of power generating air supply at a flow rate greater than that used for SR2, and by setting the flow rate of reforming air supplied to a flow rate less than that used for POX2, a state is established whereby fuel gases reliably ignite, and air flow at the top end portion of the fuel cell assembly 12 is stabilized. This enables stable flame diffusion and stable ignition (see the "POX1" state in FIG. 9).

The power generating air supply flow rate is held at a high flow rate (100 L/min) starting from the combustion operating region, through the POX1, POX2, ATR1 (described in detail below), the ATR 2 (described in detail below) and the SR1 (described in detail below), and the regions up to the time t8 at which SR2 starts (the combustion operating region, the POX1 operating region, the POX2 operating region, the ATR1 operating region, the ATR2 operating region, and the SR1 operating region); in particular, even if flame diffusion characteristics are improved in the combustion operating region including the ignition timing, and the top end of the fuel gas flow paths 98 on a portion of the fuel cell stack 14 fuel cell units 16 are in an ignited state, flame diffusion can be quickly induced over the entire fuel cell stack 14 to achieve complete ignition. Combustion can thus be stabilized even during the period immediately following ignition, which tends to be unstable, and the production of CO and the like can be reliably suppressed.

Furthermore, there is a tendency at the time when the flow rate of power generating air is first increased (time t0-t1 in FIG. 7) for air flow to become turbulent at the top end portion of the fuel cell assembly 12, but reliable ignition can be secured by waiting for a stable air flow period before igniting (time t2 in FIG. 7).

In the combustion operating region and the POX1 region in which a tentative partial oxidation reform reaction is being performed, air flow at the top end portion of the fuel assembly 12 is stabilized by holding both the reforming air and the power generating air supply flow rates fixed without variation.

Furthermore, the reforming air supply flow rate in the combustion operating region and the POX1 region is maintained at a level below the generating air supply flow rate and below the flow rate of reforming air used for a stable partial oxidation reforming reaction (POX2), such that fast flame diffusion characteristics can be achieved.

In the combustion operation region which includes the ignition timing and the POX1 region, reliable ignition characteristics can be assured in the top end portion of the fuel cell assembly 12, which has poor ignition characteristics, by concentrating fuel gas by reducing the flow rate of reforming air below that of POX2 and increasing flow rate of fuel gas above that of ATR2.

Next, at time t5 in FIG. 7, when the temperature of the reformer 20 reaches 600° C. or above and the temperature of the fuel cell units 16 reaches 250° C. or above, the control unit 110 sends a signal to the reforming air flow rate regulator unit 44, reducing the flow rate of reforming air supply, and sends a signal to the water flow rate regulator unit 28 serving as the water supply device, starting the supply of water. This results in a change in the flow rate of reforming air supply to 8 L/min and in the flow rate of water supplied to 2 cc/min (see the "ATR1" state in FIG. 9). The steam reforming reaction is also caused to occur in the reformer 20 by the introduction of water (steam) into the reformer 20. In other words, in the "ATR1" state in FIG. 9, an auto-thermal reforming reaction (ATR) takes place, which is a blend of the partial oxidation reforming reaction and the steam reforming reaction.

In the embodiment of the present invention, the temperature of the fuel cells 16 is measured by a power generating chamber temperature sensor 142, which is a temperature detection device disposed inside the generating chamber 10. Precisely speaking, the temperature inside the generating chamber 10 and the temperature of the fuel cell units are not the same, but the temperature detected by the power generating chamber temperature sensor 142 reflects the temperature of the fuel cell units 16, and the temperature of the fuel cell units 16 can be grasped by using the power generating chamber temperature sensor 142 disposed inside the power generating chamber 10. Note that in the present specification, the term "fuel cell unit temperature" means a temperature measured by any preferred sensor which indicates a value reflecting the temperature of the fuel cell units.

Furthermore, at time t6 in FIG. 7, when the temperature of the reformer 20 reaches 600° C. or above and the temperature of the fuel cell units 16 reaches 400° C. or above, the control unit 110 sends a signal to the fuel flow rate regulator unit 38 to reduce the flow rate of fuel supplied.

The control unit 110 also sends a signal to the reforming air flow rate regulator unit 44 to reduce the flow rate of reforming air supplied, and sends a signal to the water flow rate regulator unit 28 to increase the flow rate of water supplied. This results in a change of fuel gas flow rate supplied to 4 L/min and a change in the flow rate of reforming air supplied to 4 L/min; the water supply flow rate is set to be 3 cc/min (see the "ATR2" state in FIG. 9). The decrease in the flow rate of reforming air supplied and the increase in the flow rate of water supplied results in a decrease in the proportion of the partial oxidation reforming reaction and an increase in the proportion of the steam reforming reaction within the reformer 20.

Next, at time t7 in FIG. 7, when the temperature of the reformer 20 reaches 650° C. or above and the temperature of the fuel cell units 16 reaches 600° C. or above, the control unit 110 sends a signal to the reforming air flow rate regulator unit 44, stopping the supply of reforming air.

The control unit 110 also sends a signal to the fuel flow rate regulator unit 38 reducing the flow rate of fuel gas supplied, and sends a signal to the water flow rate regulator unit 28 increasing the flow rate of water supplied. This results in a change in the fuel gas supply flow rate to 3 L/min, and a change in the water supply flow rate to 8 cc/min (see the "SR1" state in FIG. 9). Stopping the supply of reforming air stops the partial oxidation reaction in the reformer 20 so that an SR is started, in which only the steam reforming reaction occurs.

Furthermore, at time t8 in FIG. 7, when the temperature in the reformer 20 reaches 650° C. or above and the temperature in the fuel cell units 16 reaches 700° C. or above, the control unit 110 sends a signal to the fuel flow rate regulator unit 38 to reduce the flow rate of fuel gas supplied, and sends a signal to the water flow rate regulator unit 28 to reduce the flow rate of water supplied.

The control unit 110 also sends a signal to the power generating air flow rate regular unit 45 to reduce the flow rate of power generating air supplied. This results in a change in the fuel gas supply flow rate to the power generation standby fuel gas supply flow rate of 2.3 L/min, as well as a change in the water supply flow rate to 5.8 cc/min, and to a generating air supply flow rate of 80 L/min (see the "SR2" state in FIG. 9).

After the control unit 110 has maintained these supply flow rates for a predetermined generation transition interval or greater, electrical power is caused to be output from the fuel cell module 2 to the inverter 54 to start power generation (see time t9 in FIG. 7).

Next, referring to FIGS. 10-14, the makeup of the flameout ignition determination control in startup processing of the solid oxide fuel cell device 1 of the aforementioned embodiment of the present invention will be described in detail.

Figure 10:
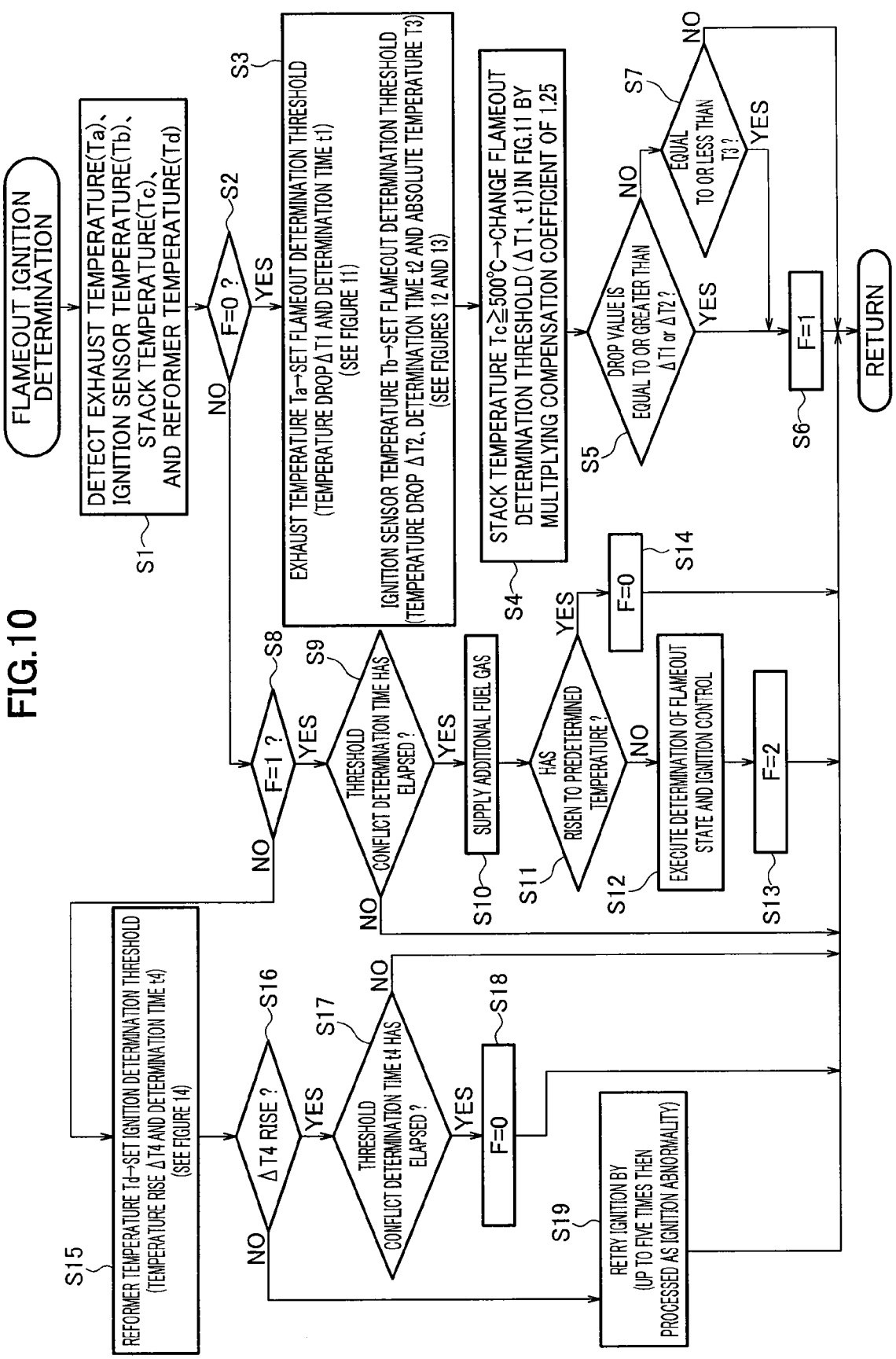
FIG. 10 is a flowchart showing an example of a flameout ignition determination control procedure in startup processing of a solid oxide fuel cell device in an embodiment of the present invention.

First, in FIG. 10, "S" denotes each of the steps. In S1, an exhaust gas temperature sensor 140 detects the temperature of exhaust gas ("exhaust temperature (Ta)" below) flowing into a hot water production device 50. An ignition sensor 152 detects the temperature in the vicinity of the top end portion of the fuel cell assembly 12 ("ignition sensor temperature (Tb)" below). Here, both the exhaust temperature (Ta) detected by the exhaust temperature sensor 140 and the ignition sensor temperature (Tb) detected by the ignition sensor 152 refer to the temperature induced by combustion of fuel gas.

In addition, a power generation chamber temperature sensor 142 detects the temperature in the vicinity of a fuel cell stack 14 to estimate the temperature ("stack temperature (Tc)" below) of the fuel cell stack 14 (i.e., the fuel cell 84 itself). A reformer temperature sensor 148 detects the temperature of the reformer 20 ("reformer temperature (Td)" below).

Next, proceeding to S2, a determination is as to whether the flag F is a 0; if flag F is determined to be a 0 in S2, the device proceeds to S3.

In S3, the exhaust temperature (Ta) detected in S1 is applied to the flameout determination threshold map (relationship between exhaust temperature and temperature drop), and the amount of temperature drop (ΔT1) and a determination time (t1) used to judge the amount of temperature drop (ΔT1) for determining the flameout are set.

More specifically, when the exhaust temperature (Ta) is in a temperature band less than Ta1, the amount of temperature drop (ΔT1) is set at 100° C., and the determination time (t1) thereof is set at 3 seconds. When the exhaust temperature (Ta) is in a temperature band equal to or greater than Ta1 and less than Ta2, the amount of temperature drop (ΔT1) is set at 70° C., and the determination time (t1) thereof is set at 1 minute. Furthermore, when the exhaust temperature (Ta) is in a temperature band equal to or greater than Ta2, the amount of temperature drop (ΔT1) is set at 30° C., and the determination time (t1) thereof is set at 3 minutes.

In other words, with respect to the flameout determination thresholds (ΔT1, t1) set by the exhaust temperature (Ta) detected by the exhaust temperature sensor 140, settings are made so that the more the detected exhaust temperature (Ta) belongs to the low temperature side of the temperature band, the greater is the amount of temperature drop (ΔT1), and the more the detected exhaust temperature (Ta) belongs to the high temperature side of the temperature band, the longer is the determination time (t1) for determining the temperature drop (ΔT1).

Figure 12:
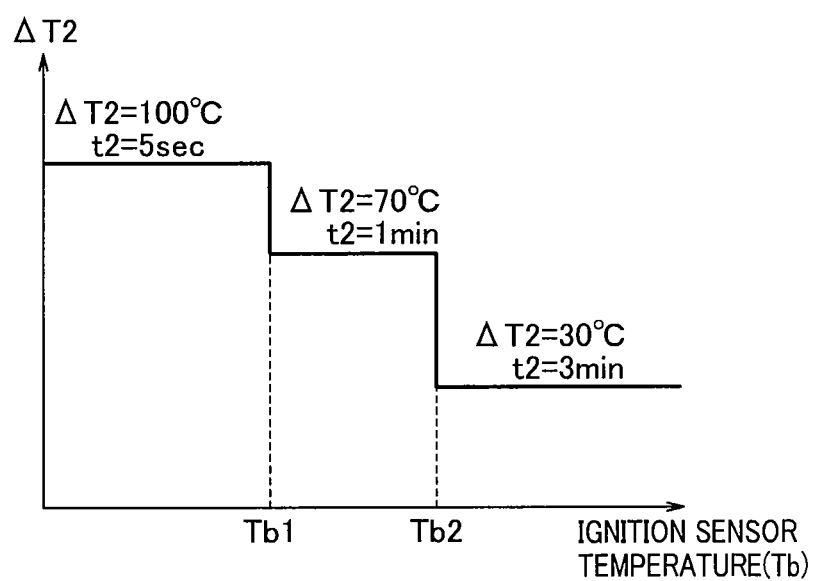
FIG. 12 is an example of a map (relationship between ignition sensor temperature and temperature drop) relating to the flameout determination threshold used in flameout ignition determination control for startup processing of a solid oxide fuel cell device in an embodiment of the present invention.

In addition, in S3, the ignition sensor temperature (Tb) detected in S1 is applied to the flameout determination threshold map (relationship between ignition sensor temperature and temperature drop) shown in FIG. 12, and the amount of temperature drop (ΔT2) and the determination time (t2) used to judge the amount of temperature drop (ΔT2) for determining the flameout are set.

More specifically, when the ignition sensor temperature (Tb) is in a temperature band less than Tb1, the amount of temperature drop (ΔT2) is set at 100° C., and the determination time (t2) thereof is set at 5 seconds. When the ignition sensor temperature (Tb) is in a temperature band equal to or greater than Tb1 and less than Tb2, the amount of temperature drop (ΔT2) is set at 70° C., and the determination time (t2) thereof is set at 1 minute. Furthermore, when the ignition sensor temperature (Tb) is in a temperature band above Tb2, the amount of temperature drop (ΔT2) is set at 30° C., and the determination time (a) thereof is set at 3 minutes.

In other words, with respect to the flameout determination thresholds (ΔT2, t2) set according to the ignition sensor temperature (Tb) detected by the ignition sensor 152, settings are made so that the more the detected ignition sensor temperature (Tb) belongs to the temperature band on the low temperature side, the greater is the amount of temperature drop (ΔT2) setting, and the more the detected ignition sensor temperature (Tb) belongs to the temperature band on the high temperature side, the longer is the determination time (t2) for determining the amount of temperature drop (ΔT2).

Figure 11:
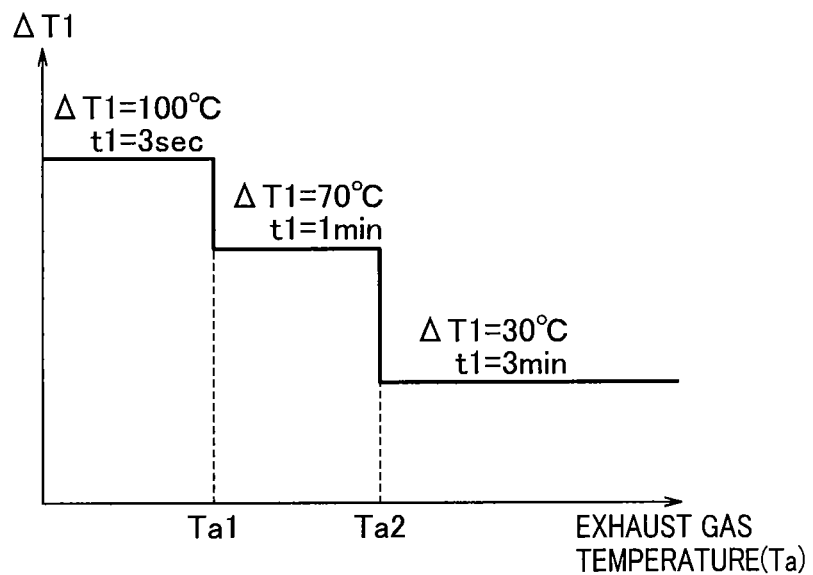
FIG. 11 is an example of a map (relationship between exhaust temperature and temperature drop) relating to the flameout determination threshold used in flameout ignition determination control for startup processing of a solid oxide fuel cell device in an embodiment of the present invention.

When the exhaust temperature (Ta) in FIG. 11 is in a temperature band below Ta1, the amount of temperature drop (ΔT1) is set at 100° C., and the determination time Op thereof is set at 3 seconds, whereas when the ignition sensor temperature (Tb) in FIG. 12 is in a temperature band below Tb1, the amount of temperature drop (ΔT2) is set at 100° C., and the determination time (t2) thereof is set at 5 seconds; an effort is made to avoid erroneous judgments by setting the determination time (t2) for the amount of temperature drop (ΔT2) in the low ignition sensor temperature state to be longer than the determination time (t1) for the amount of temperature drop (ΔT1) based on the exhaust temperature (Ta).

Figure 13:
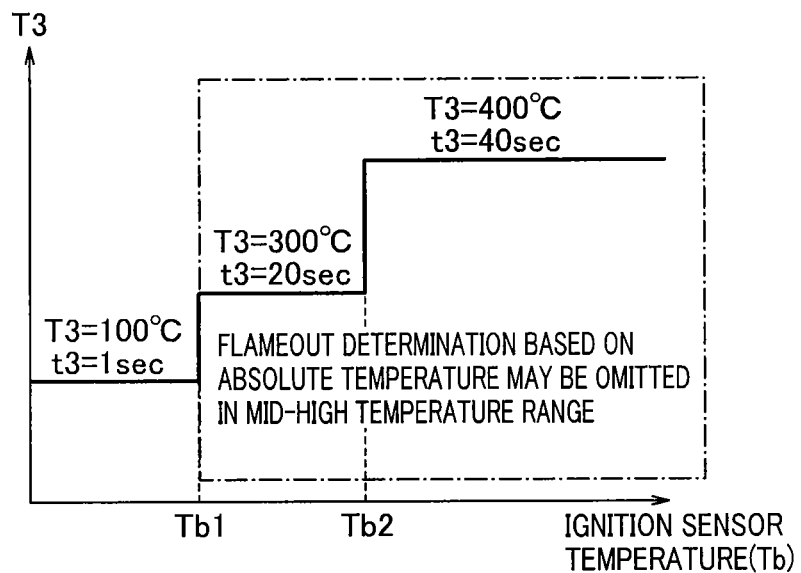
FIG. 13 is an example of a map (relationship between ignition sensor temperature and absolute temperature) relating to the flameout determination threshold used in flameout ignition determination control for startup processing of a solid oxide fuel cell device in an embodiment of the present invention.

In S3, the ignition sensor temperature (Tb) detected in S1 is applied to the flameout determination threshold map (relationship between ignition sensor temperature and absolute temperature) shown in FIG. 13, and the absolute temperature (T3) and a determination time (t3) used to judge the absolute temperature (T3) for determining the flameout are set.

More specifically, when the ignition sensor temperature (Tb) is in a temperature band less than Tb1, the absolute temperature (T3) is set at 100° C., and the determination time (t3) thereof is set at 1 second. When the ignition sensor temperature (Tb) is in a temperature band equal to or greater than Tb1 and less than Tb2, the absolute temperature (T3) is set at 300° C., and the determination time (t3) thereof is set at 20 seconds. Furthermore, when the ignition sensor temperature (Tb) is in a temperature band above Tb2, the absolute temperature (T3) is set at 400° C., and the determination time (t3) thereof is set at 40 seconds.

In other words, with respect to the flameout determination thresholds (T3, t3) set according to the ignition sensor temperature (Tb) detected by the ignition sensor 152, settings are made so that the more the detected ignition sensor temperature (Tb) belongs to the temperature band on the high temperature side, the higher is the absolute temperature (T3), and the longer is the determination time (T3) thereof.

Note that when the ignition sensor temperature (Tb) is in a temperature region above Tb1, for example when it is in a mid-high temperature range above 100° C., flameout determination based on absolute temperature (T3) and determination time (t3) may be omitted.

Moreover, as shown in FIGS. 12 and 13, when the determination time t2 for determining the amount of temperature drop ($\Delta$T2) for the flameout determination threshold is compared to the determination time t3 for determining the absolute temperature (t3) for the flameout determination threshold in the same temperature band of the ignition sensor temperature (Tb), t3 is shorter than t2.

Next, proceeding from S3 to S4, when the stack temperature (Tc) detected in S1 is 500° C. or greater, the amount of temperature drop ($\Delta$T1) and the determination time (t1) thereof for the exhaust temperature (Ta) flameout determination threshold map shown in FIG. 11 are each respectively multiplied by a compensation coefficient of 1.25; the flameout determination threshold map for exhaust temperature (Ta) is changed, and the device proceeds to S5.

On the other hand, in S4, if the stack temperature (Tc) detected in S1 is less than 500° C., the device proceeds to S5 without changing the flameout determination threshold map for the exhaust temperature (Ta) shown in FIG. 11.

In other words, the higher the stack temperature (Tc) inside the fuel cell module 2 becomes, the higher the exhaust temperature (Ta) flameout determination thresholds ($\Delta$T1, t1) are set to be.

Next, in S5, the amount of temperature drop is measured based on the exhaust temperature (Ta) detected by the exhaust temperature sensor 140 in a predetermined time interval, and this temperature drop measured value is compared to the flameout determination threshold temperature drop ($\Delta$T1) for the exhaust temperature (Ta) set in S4 (see FIG. 11).

Similarly, the amount of temperature drop is measured based on the ignition sensor temperature (Tb) detected by the ignition sensor 152 in a predetermined time interval, then compared with the flameout determination threshold temperature drop ($\Delta$T2) of the ignition sensor temperature (Tb) set in S4 (see FIG. 12).

When the measured value of the temperature drop for the exhaust temperature (Ta) is equal to or greater than the flameout determination threshold temperature drop ($\Delta$T1) for the exhaust temperature (Ta) set in S4, or when the measured valve of the temperature drop for the igniting sensor temperature (Tb) is equal to or greater than the flameout determination threshold temperature drop ($\Delta$T2) of the ignition sensor temperature (Tb) set in S4, the device proceeds to S6 and flag F is determined to be a 1.

On the other hand, in S5, when the measured value of the temperature drop for the exhaust temperature (Ta) is less than the flameout determination threshold temperature drop ($\Delta$T1) for the exhaust temperature (Ta) set in S4, and the measured value of the temperature drop for the ignition sensor temperature (Tb) is less than the flameout determination threshold temperature drop ($\Delta$T2) for the ignition sensor temperature (Tb) set in S4, the device proceeds to S7.

Next, in S7, the ignition sensor temperature (Tb) measured value detected by the ignition sensor 152 is compared to the flameout determination threshold absolute temperature (T3) for the ignition sensor temperature (Tb) set in S3 (see FIG. 13); if the ignition sensor temperature (Tb) measured value is equal to or less than the flameout determination threshold absolute temperature (T3) for the ignition sensor temperature (Tb), the device proceeds to S6, and the flag F is determined to be a 1.

Next, in S2, when the flag F is determined not to be a 0, the device proceeds to S8, and a determination is made as to whether or not the flag F is a 1.

In S8, if the flag F is determined to be a 1, the device proceeds to S9, and a determination is made as to whether there is a conflict between the measured value of the temperature drop based on the exhaust temperature (Ta) detected by the exhaust temperature sensor 140, the measured value of the ignition sensor temperature (Tb) detected by the ignition sensor 152, and the measured value of the temperature drop based on this ignition sensor temperature (Tb) measured value, relative to each of the set flameout determination thresholds ($\Delta$T1, $\Delta$T2, T3) set in S3 and S4; if is determined that there is a conflict, a determination is made as to whether the flameout determination threshold predetermined determination times (t1, t2, t3) have elapsed.

Furthermore, in S9, when the predetermined flameout determination threshold determination times (t1, t2, t3) have elapsed with each of the flameout determination thresholds ($\Delta$T1, $\Delta$T2, T3) in a conflicting state, the device proceeds to S10.

In S10, the control section 110 sends a signal to the fuel flow rate regulator unit 38 which serves as a fuel gas supply device; additional fuel gas is supplied in a predetermined quantity to the reformer 20, the device proceeds to S11, and a determination is made as to whether the exhaust temperature (Ta) and ignition sensor temperature (Tb) detected by the exhaust temperature sensor 140 and the ignition sensor 152 have respectively risen by a predetermined temperature.

Next, in S11, if the exhaust temperature (Ta) and the ignition sensor temperature (Tb) respectively detected by the exhaust temperature sensor 140 and the ignition sensor 152 have not risen to a predetermined temperature, notwithstanding the supply of additional fuel gas in S10, the device proceeds to S12; a determination is made that a flameout state has occurred, and ignition control is executed. The device then proceeds to S13, and flag F is determined to be at 2.

On the other hand, if, in S11, at least one of the exhaust temperature (Ta) and the ignition sensor temperature (Tb) respectively detected by the exhaust temperature sensor 140 and the ignition sensor 152 has risen to a predetermined temperature due to the supply of additional fuel gas in S10, the device proceeds to S14 and the flag F is determined to be a 0.

Next, in S8, if it is determined that the flag F is a 2, the device proceeds to S15.

Figure 14:
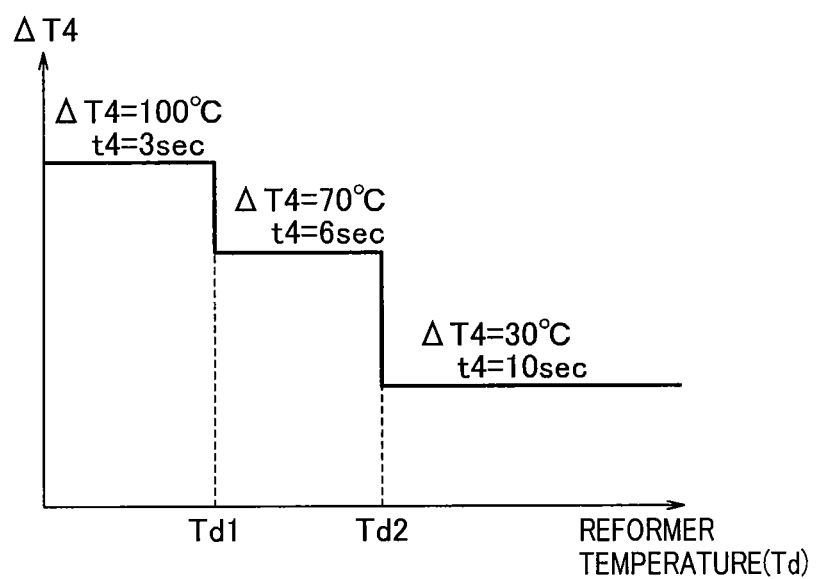
FIG. 14 is an example of a map (relationship between reformer sensor temperature and temperature drop) relating to the flameout determination threshold used in flameout ignition determination control for startup processing of a solid oxide fuel cell in an embodiment of the present invention.

In S15, the reformer temperature (Td) detected by the reformer temperature sensor 148 in S1 is applied to the ignition determination threshold map (relationship between the reformer sensor temperature and the amount of temperature drop) shown in FIG. 14, and a temperature rise ($\Delta$T4) used to judge the ignition determination, and a time (t4) for determining that temperature rise ($\Delta$T4) are set.

More specifically, when the reformer temperature (Td) is in a temperature band below Td1, the temperature rise ($\Delta$T4) is set at 100° C., and the determination time (t4) thereof is set at 3 seconds. When the reformer temperature (Td) is in a temperature band equal to or greater than Td1 and less than Td2, the temperature rise ($\Delta$T4) is set at 70° C., and the determination time (t4) thereof is set at 6 seconds. Furthermore, when the reformer temperature (Td) is in a temperature band equal to or greater than Td2, the temperature rise (ΔT4) is set at 30° C., and the determination time (t4) thereof is set at 10 seconds.

In other words, with respect to the ignition determination thresholds (ΔT4, t4) set according to the reformer temperature (Td) detected by the reformer temperature sensor 148, the more the detected reformer temperature (Td) belongs to the temperature band on the high temperature side, the lower the temperature rise (ΔT4) and the longer the determination times thereof are set to be.

Next, proceeding to S16, the temperature rise is measured based on the reformer temperature (Td) detected by the reformer temperature sensor 148 in a predetermined time interval, and this measured value for the temperature rise is compared to the ignition determination threshold temperature rise (ΔT4) for the reformer temperature (Td) set in S15 (see FIG. 14).

If it is determined that the measured value of the temperature rise in the reformer temperature (Td) is greater than the ignition determination threshold temperature rise (ΔT4) for the reformer temperature (Td) set in S15, the device proceeds to S17.

Next, in S17, a determination is made as to whether the measured value of the temperature rise based on the reformer temperature (Td) detected by the reformer temperature sensor 148 conflicts with the ignition determination threshold temperature rise (ΔT4) set in S15; if it is determined that there is a conflict, a determination is made as to whether an ignition determination threshold predetermined determination time (t4) has elapsed.

In S17, if the ignition determination threshold predetermined determination time (t4) has elapsed in a state conflicting with the temperature rise (ΔT4) for the ignition determination threshold, the device proceeds to S18; determination is made that ignition state has occurred, and flag F is determined to be a 0.

On the other hand, if it is determined in S16 that the measured value of the temperature rise in the reformer temperature (Td) is not equal to or greater than the reformer temperature (Td) ignition determination threshold temperature rise (ΔT4) set in S15, the device proceeds to S19, and the control section 110 sends a signal to the ignition device 83 to retry ignition. The ignition retry is performed five times, then processed as an ignition abnormality.

In the solid oxide fuel cell (SOFC) device of the above-described embodiment of the present invention, the lower the combustion temperature associated with combustion of fuel gas, the lower will be the temperatures of the fuel assembly 12, the fuel module 2, and so forth; at the same time, temperature drop due to flameout will be very quick, and while it is difficult for a temperature drop to occur when the combustion temperature is relatively high due to the large stored heat in the fuel cell assembly 12 or the fuel cell module 2, the flameout determination threshold (ΔT1, ΔT2) used for flameout determination is arranged to increase as the combustion temperature drops, therefore accurate and quick flameout determination can be accomplished in accordance with the temperature state of the fuel assembly 12 and the fuel cell module 2, thus enabling quick recovery from flameout.

In the solid oxide fuel cell (SOFC) device of the embodiment of the present invention, the flameout determination thresholds (ΔT 1, t1, ΔT2, t2, T3, t3) used for flameout determination are set in respective dependence on the exhaust temperature (Ta), ignition sensor temperature (Tb), and stack temperature (Tc) detected by the respective sensors 140, 15, and 142, therefore flameout determination can be even more reliably and quickly performed, and erroneous judgments even more effectively prevented.

Moreover, in the solid oxide fuel cell (SOFC) device according to the embodiment of the present invention, erroneous determinations do occur when determining flameout based on temperature drops, due to the occurrence of temperature drops caused by variations in heat of combustion, necessitating an extension of the determination time, but by considering a state, in which the temperature drops below a predetermined threshold absolute temperature (T3) for flameout determination, to be a flameout, a reliable determination can be achieved.

In the solid oxide fuel cell (SOFC) device of the embodiment of the present invention, the temperature inside the fuel assembly 12 or the fuel cell module 2 is low in a relatively low temperature atmosphere, and flameout determination can also be made based on this low absolute temperature, but flameout determination using absolute temperature is difficult in a relatively high temperature atmosphere, therefore by setting the temperature drop to be the flameout determination threshold, a reliable determination can be made using even a small temperature drop when a flameout occurs.

Furthermore, in the solid oxide fuel cell (SOFC) device according to the embodiment of the present invention, the flameout determination thresholds (ΔT1, t1, ΔT2, t2, T3, t3) used for flameout determination are set to be respectively dependent on the exhaust temperature (Ta), ignition sensor temperature (Tb), and stack temperature (Tc) detected by the respective sensors 140, 152, and 142 so that the advantageous regions of each of the respective flameout determination threshold can be used, with each compensating for the other's disadvantageous regions, thus enabling reliable flameout determination. In addition, by respectively optimizing the determination times (t1, t2, and t3), erroneous determinations can be even more effectively prevented, and quick and accurate flameout determinations can be made.

In the solid oxide fuel cell (SOFC) device according to the embodiment of the present invention, a quick determination can be accomplished by detecting the exhaust gas temperature (Ta); when the stack temperature (Tc) is equal to or greater than 500° C., the exhaust temperature (Ta) flameout determination threshold map can be changed by multiplying the amounts of the temperature drop (ΔT1) and the determination time (t1) for the exhaust temperature (Ta) flameout determination threshold map shown in FIG. 11 by a compensation coefficient of 1.25, thereby enabling an even more accurate flameout determination.

Furthermore, in the solid oxide fuel cell (SOFC) device of the embodiment of the present invention, with respect to the flameout determination thresholds (ΔT1, t1) set by the exhaust temperature (Ta) detected by the exhaust temperature sensor 140, settings are made so that the more the detected exhaust temperature (Ta) belongs to the temperature band on the low temperature side, the greater is the amount of temperature drop (ΔT1), and the more the detected exhaust temperature (Ta) belongs to the temperature band on the high temperature side, the longer is the determination time (t1) for determining the amount of temperature drop (ΔT1); settings are also made so that the more the detected ignition sensor temperature (Tb) belongs to the temperature band on the low temperature side, the greater is the amount of temperature drop (ΔT2), and the more the detected ignition sensor temperature (Tb) belongs to the temperature band on the high temperature side, the longer is the determination time (t2) for determining the amount of temperature drop (ΔT2), thus enabling even more accurate flameout determination.

In the solid oxide fuel cell (SOFC) device according to the embodiment of the present invention, if the exhaust temperature (Ta) and the ignition sensor temperature (Tb) respectively detected by the exhaust temperature sensor 140 and the ignition sensor 152 do not rise by predetermined temperature even when additional fuel gas is supplied, a determination is made of a flameout state, and ignition control is executed. As a result, even when there is an extremely large number of fuel cells 84, and there is a limit on the number of ignition sensors 152 which can be attached, making flameout determination extremely difficult, flameout can be reliably determined by confirming that the combustion temperature does not rise when fuel gas is increased.

In addition, in the solid oxide fuel cell (SOFC) device according to the embodiment of the present invention, the control section 110 determines flameout using the exhaust temperature sensor 140 and the ignition sensor 152, and determines ignition using the reformer temperature sensor 148, therefore flameout and ignition can be reliably determined.

In the solid oxide fuel cell (SOFC) device of the embodiment of the present invention, it is described as an example a case in which the flameout determination threshold is set and flameout determination is made based on the exhaust temperature (Ta) and ignition sensor temperature (Tb) respectively detected by the exhaust temperature sensor 140 and the ignition sensor 152, but flameout determination can also be made using either the exhaust temperature sensor 140 or the ignition sensor 152.

Although the present invention has been explained with reference to specific, preferred embodiments, one of ordinary skilled in the art will recognize that modifications and improvements can be made while remaining within the scope and spirit of the present invention. The scope of the present invention is determined solely by appended claims.

What is claimed is:

1. A solid oxide fuel cell system for generating electrical power by reacting fuel gas and air, comprising:
    a fuel cell assembly disposed in a power generating chamber inside a fuel cell module and comprising a plurality of solid oxide fuel cells;
    a reformer that steam-reforming the fuel gas and supplies the fuel gas to the fuel cell assembly;
    a fuel gas supply device that supplies the fuel gas to the reformer;
    a water supply device that produces pure water and supplies the pure water to the reformer;
    a reforming air supply device that supplies reforming air to the reformer;
    a power generating air supply device that supplies power generating air to the fuel cell assembly;
    an ignition device that ignites the fuel gas which has reached the upper portion of the fuel cell assembly from the reformer;
    a temperature detection device that detects a temperature indicative of combustion of the fuel gas, which is one of a temperature of exhaust gas, a temperature of the fuel cell assembly and a temperature of the reformer; and
    a control device programed to control the fuel gas supply device, the water supply device, the reforming air supply device, the power generating air supply device, the ignition device, and the temperature detection device to conduct a combustion operation in which the fuel gas is ignited by the ignition device and combusted with the reforming air during a startup of the solid oxide fuel cell device, and then to supply the fuel gas and water into the reformer to conduct a steam reforming reaction (SR) operation, thereby starting generation of electricity by the solid oxide fuel cell device,
    wherein a plurality of predetermined temperature drop rates are defined, respectively, for a plurality of temperature ranges such that a predetermined temperature drop rate becomes higher as a temperature range becomes lower, and
    wherein the control device is programed to detect a flameout when the control device detects an occurrence of one or more of at least one operation condition of the solid oxide fuel cell device, wherein the at least one operation condition comprises a first operation condition in which the temperature detected by the temperature detection device drops at a rate greater than the predetermined temperature drop rate defined for a temperature range within which the temperature detected by the temperature detection device falls.

2. The solid oxide fuel cell system according to claim 1, wherein the at least one operation condition further comprises a second operation condition in which the temperature detected by the temperature detection device is equal to or lower than a predetermined temperature.

3. The solid oxide fuel cell system according to claim 1, wherein the at least one operation condition further comprise a third operation condition that the temperature detected by the temperature detection device continues dropping for a first predetermined time at a rate equal to or greater than the predetermined temperature drop rate defined for the temperature range within which the temperature detected by the temperature detection device falls.

4. The solid oxide fuel cell system according to claim 1, wherein the temperature detection device detects a temperature of exhaust gas produced by combustion of the fuel gas.

5. The solid oxide fuel cell system according to claim 2, wherein the temperature detection device directly detects a temperature of combustion of the fuel gas which occurs at a top end of the fuel cell assembly.

6. The solid oxide fuel cell system according to claim 3, wherein the at least one operation condition further comprises a fourth operation condition that the temperature detected by the temperature detection device continues equal to or less than a predetermined temperature for at least a second predetermined time, and the second predetermined time is set to be shorter than the first predetermined time.

7. The solid oxide fuel cell system according to claim 3, wherein the controller is programed to increase the predetermined temperature drop rates when a temperature of the power generating chamber inside the fuel cell module is equal to or greater than a predetermined temperature.

8. The solid oxide fuel cell system according to claim 7, wherein the controller increases the first predetermined time when the temperature of the power generating chamber is equal to or greater than the predetermined temperature.

9. The solid oxide fuel cell system according to claim 1, wherein:
    the control device is programed to increase, when the controller detects a flameout, a supply rate of the fuel gas; and
    the control device is programed to operate the ignition device to re-ignite the fuel gas after the supply rate of the fuel gas is increased, if the temperature detected by the temperature detection device does not rise.

10. The solid oxide fuel cell system according to claim 9, further comprising a reformer temperature detector that detects a temperature of the reformer, wherein the control device is programed to determine, using the reformer temperature detected by the reformer temperature detector, whether a re-ignition of the fuel gas has occurred.

11. A solid oxide fuel cell system comprising:
a fuel cell module comprising a plurality of solid oxide fuel cells. The fuel cell module being supplied with fuel gas to generate electricity;
a plurality of temperature sensors placed in the solid fuel cell device to measure temperatures inside the solid fuel cell device; and
a controller programed to perform stages of operations to detect a flameout, wherein the control device is programed to implement, during a first stage of operations,:
detecting at least one first temperature measured, respectively, by at least one of the plurality of temperature sensors;
for respective the at least one first temperature, determining a temperature drop rate which is a function of the detected first temperature, in which the temperature drop rate becomes higher as the detected first temperature becomes lower;
monitoring the respective at least one first temperature to calculate a change of the first temperatures monitored at an interval; and
for the respective at least one first temperature, determining whether the calculated change is greater than the determined temperature drop rate.

12. The solid oxide fuel cell system according to claim 11, where the at least one first temperature comprises at least one of an exhaust gas temperature and an ignition sensor temperature.

13. The solid oxide fuel cell system according to claim 11, wherein if it is determined that the change calculated for the respective at least one first temperature is greater than the determined temperature drop rate, the controller is further programed to implement, during the first stage:
detecting a second temperature measured by one of the plurality of temperature sensors;
determining a temperature threshold which is a function of the detected second temperature, in which the temperature threshold becomes lower as the detected second temperature becomes lower; and
determining whether the detected second temperature is lower than that the determined temperature threshold.

14. The solid oxide fuel cell system according to claim 13, wherein the second temperature comprises an ignition sensor temperature.

15. The solid oxide fuel cell system according to claim 11, wherein the controller is further programed to implement, during the first stage,:
detecting a third temperature measured by one of the plurality of temperature sensors:
determining if the detected third temperature is higher than a predetermined temperature level; and
if it is determined that the detected third temperature is higher than the predetermined temperature level, increasing the determined temperature drop rate.

16. The solid oxide fuel cell system according to claim 11, wherein the controller is further programed to implement, during a second stage subsequent to the first stage:
monitoring the first temperature at intervals during a first time duration to calculate a difference between first temperatures monitored at each interval, wherein the first time duration is a function of the detected first temperature, in which the time duration becomes longer as the detected first temperature becomes higher; and
determining whether each calculated difference is greater than the determined temperature drop rate.

17. The solid oxide fuel cell system according to claim 16, wherein the controller is further programmed to implement, during the first stage:
detecting a fourth temperature measured by one of the plurality of temperature sensors:
determining if the detected fourth temperature is higher than a predetermined temperature level; and
if it is determined that the detected fourth temperature is higher than the predetermined temperature level, increasing the time duration.

18. The solid oxide fuel cell system according to claim 16, wherein if it is determined that all of the differences calculated during the time duration are each greater than the determined temperature drop rate, the controller is further programed to implement, during the second stage,:
increasing a supply rate of the fuel gas to the fuel cell module;
monitoring a fifth temperature measured by one of the plurality of temperature sensors;
determining whether the fifth temperature is rising; and
if it is determined that the fifth temperature is not rising, igniting the fuel gas.

19. The solid oxide fuel cell system according to claim 18, wherein after igniting the fuel gas, the controller is further programed to implement, during a third stage subsequent to the second stage:
detecting a sixth temperature measured by one of the temperature sensors;
determining a temperature rise rate which is a function of the detected sixth temperature, in which the temperature rise rate becomes higher as the detected sixth temperature becomes lower;
determining a second time duration which is a function of the detected sixth temperature, in which the second time duration becomes longer as the detected sixth temperature becomes higher;
monitoring the sixth temperature at intervals during the determined second time duration to calculate a difference between sixth temperatures monitored at each interval; and
determining whether each calculated difference is greater than the determined temperature rise rate.

20. The solid oxide fuel cell system according to claim 19, wherein the sixth temperature comprises a reformer temperature.

* * * * *